July 13, 1937.  G. STALKER  2,087,128
DANDELION AND WEED PULLER
Filed Sept. 9, 1936
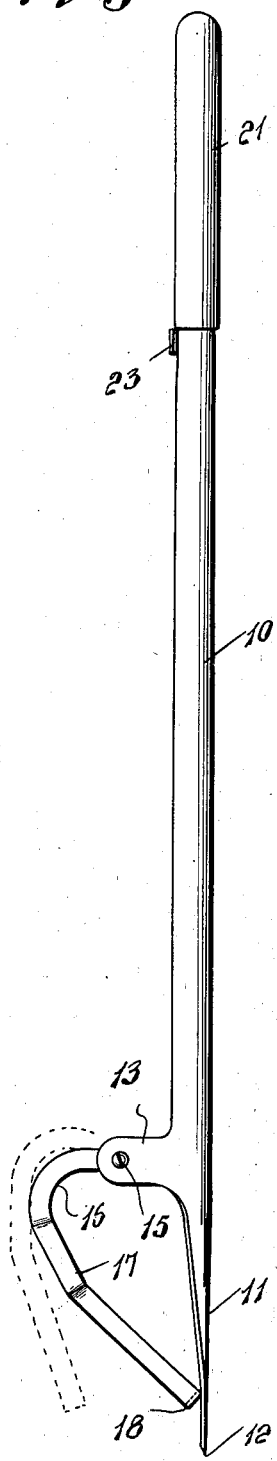
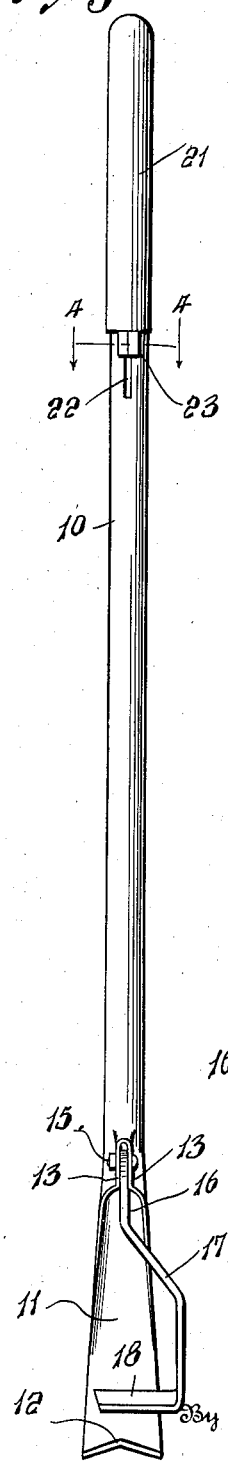
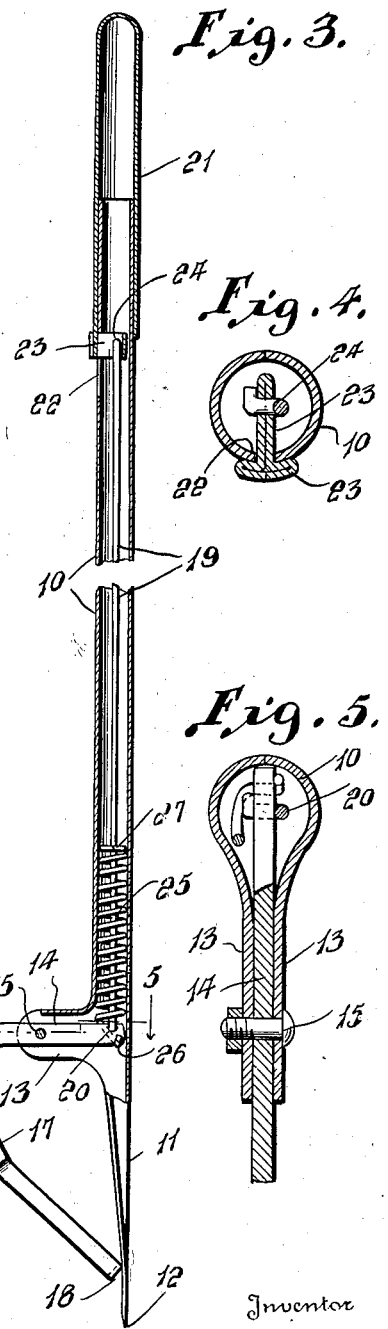
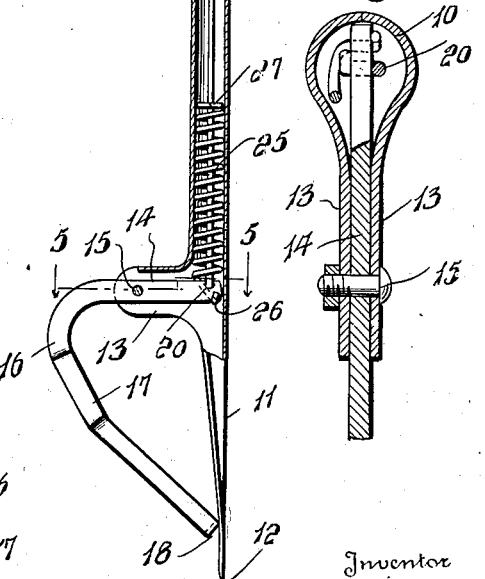
Inventor
George Stalker Patented July 13, 1937

2,087,128

UNITED STATES PATENT OFFICE 2,087,128

DANDELION AND WEED PULLER

George Stalker, Albion, Nebr.

Application September 9, 1936, Serial No. 100,019

2 Claims. (Cl. 55—148)

This invention relates to certain new and useful improvements in dandelion and weed puller.

The primary object of the invention is to provide a dandelion and weed puller in the form of an elongated tool so that the user thereof may stand in an upright position when removing dandelions and various kinds of weeds from a lawn or the like.

A further object of the invention is to provide a dandelion and weed puller of the foregoing character wherein the outer end of an elongated tubular shaft is flattened and sharpened at its outer end to provide a cutting blade with a gripping jaw pivotally mounted on the tubular shaft adjacent the inner end of the cutting blade and tensioned by a spring housed within the tubular shaft to have the gripping end thereof normally engaged with the blade at a point spaced from the outer end and with a tubular handle telescopically mounted on the inner end of the tubular shaft and having a rod connection within the tubular shaft with the gripping jaw for shifting the latter to a position to space the gripping end thereof from the cutting blade when the latter is being forced into the ground in severing engagement with a dandelion, weed or the like.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of a dandelion and weed puller constructed in accordance with the present invention, the gripping jaw being illustrated by dotted lines in a position spaced from the cutter blade;

Figure 2 is a front elevational view of the device;

Figure 3 is a longitudinal sectional view showing the gripping jaw pivoted on the tubular shaft and tensioned by a spring housed within the latter with the operating handle and rod for the gripping jaw;

Figure 4 is a cross-sectional view taken on line 4—4 of Figure 2, showing the connection between the gripping jaw shifting rod and the sliding handle; and Figure 5 is a cross-sectional view taken on line 5—5 of Figure 3, showing the pivotal mounting of the gripping jaw in ears laterally projecting from the outer end of the tubular shaft.

Referring more in detail to the accompanying drawing, the dandelion and weed puller includes an elongated tubular shaft 10 that is cut away at one side thereof adjacent its outer end and flattened to provide a cutter blade 11 having a fork-shaped sharpened outer terminal end 12 as clearly shown in Figure 2.

A weed gripping jaw is associated with the cutter blade 11 and the pivotal mounting of the cutter blade is facilitated by the provision of a pair of laterally projecting parallel ears 13 carried by the tubular shaft 10 adjacent the inner end of the cutting blade. The gripping jaw as shown in Figure 3 comprises a straight arm section 14 that is pivoted as at 15 between and adjacent the outer ends of the ears 13, the inner end of the arm section 14 terminating in proximity of the rear side of the tubular shaft 10 as illustrated. The outer end of the arm section 14 has a return-bent portion 16 that is laterally offset as at 17 with the outer terminal end thereof bent at right angles as at 18 to overlie and be normally engaged with the flat cutter blade 11 adjacent its outer cutting end 12.

Means is provided for normally holding the gripping end 18 of the gripping jaw engaged with the cutter blade 11 and also for moving the gripping jaw on its pivotal mounting 15, such means including a rod 19 extending longitudinally within the tubular shaft 10, the lower end of the rod 19 being pivotally attached as at 20 to the inner end of the arm section 14 of the gripping jaw while the inner end of the rod 19 is engaged with a slidably mounted handle 21 telescopically mounted upon the inner end of the tubular shaft 10. As shown in Figures 2 to 4, the inner end of the tubular shaft 10 is longitudinally slotted as at 22 and an ear 23 carried by the handle 21 extends into the tubular shaft 10 through the slot 22 with the adjacent end of the rod 19 attached thereto as at 24. A coil spring 25 surrounds the rod 19 adjacent the outer end thereof, one end of the spring 25 being anchored as at 26 to the inner end of the arm section 14 of the gripping jaw while the other end of the spring 25 is engaged with an abutment 27 within the tubular shaft 10 and through which the rod 19 is slidable. The spring 25 is anchored to the fixed abutment 27 and the action of the spring is to move the gripping jaw on its pivotal mounting 15 to cause the gripping end 18 thereof to be normally engaged with the cutter blade 11 and with the handle 21 at its outer limit of movement on the tubular shaft 10.

In the use of the tool, the tubular handle 21 is slidably shifted upon the tubular shaft 10, this movement causing the rod 19 to shift the gripping jaw against the tension of the spring 25 into the position shown in dotted lines in Figure 1 and at which time the cutter blade 11 may be forced into the ground for severing engagement with the underlying roots of a dandelion or weed, the release of pressure on the handle 21 permitting the spring 25 to shift the gripping jaw to the full positions shown in Figures 1 and 3 and into engagement with a dandelion or weed, and at which time the dandelion or weed may be readily removed from the ground.

From the above detailed description of the invention, it is believed that the construction and use thereof will at once be apparent and while there is herein shown and described the preferred embodiment of the invention, it is nevertheless to be understood that minor changes may be made therein without departing from the spirit and scope of the invention as claimed.

I claim:—

1. In a dandelion and weed puller, a tubular shaft, a cutter blade at the outer end thereof, a gripping jaw pivotally mounted on the tubular shaft adjacent the cutter blade, means within the tubular shaft and associated with the gripping jaw for normally holding the same engaged with the cutter blade, an operating device for said means carried by the inner end of the tubular shaft, said means including a rod extending axially of the tubular shaft and attached at its outer end to the gripping jaw, a spring associated with the rod, jaw and shaft, and said operating device including a tubular handle slidable upon the inner end of the shaft and connected to the inner end of the rod to effect movement thereof.

2. In a dandelion and weed puller, a tubular shaft, a cutter blade at the outer end thereof, a gripping jaw pivotally mounted on the tubular shaft adjacent the cutter blade, means within the tubular shaft and associated with the gripping jaw for normally holding the same engaged with the cutter blade, an operating device for said means carried by the inner end of the tubular shaft, said means including a rod extending axially of the tubular shaft and attached at its outer end to the gripping jaw, a spring associated with the rod, jaw and shaft, and said operating device including a tubular handle slidable upon the inner end of the shaft, said shaft being slotted adjacent the inner end of the rod and means extending through the shaft slot and connecting the handle to the rod for operation of the latter.

GEORGE STALKER.